3,382,048
METHOD OF PRETREATING METALLIC HYDRIDES

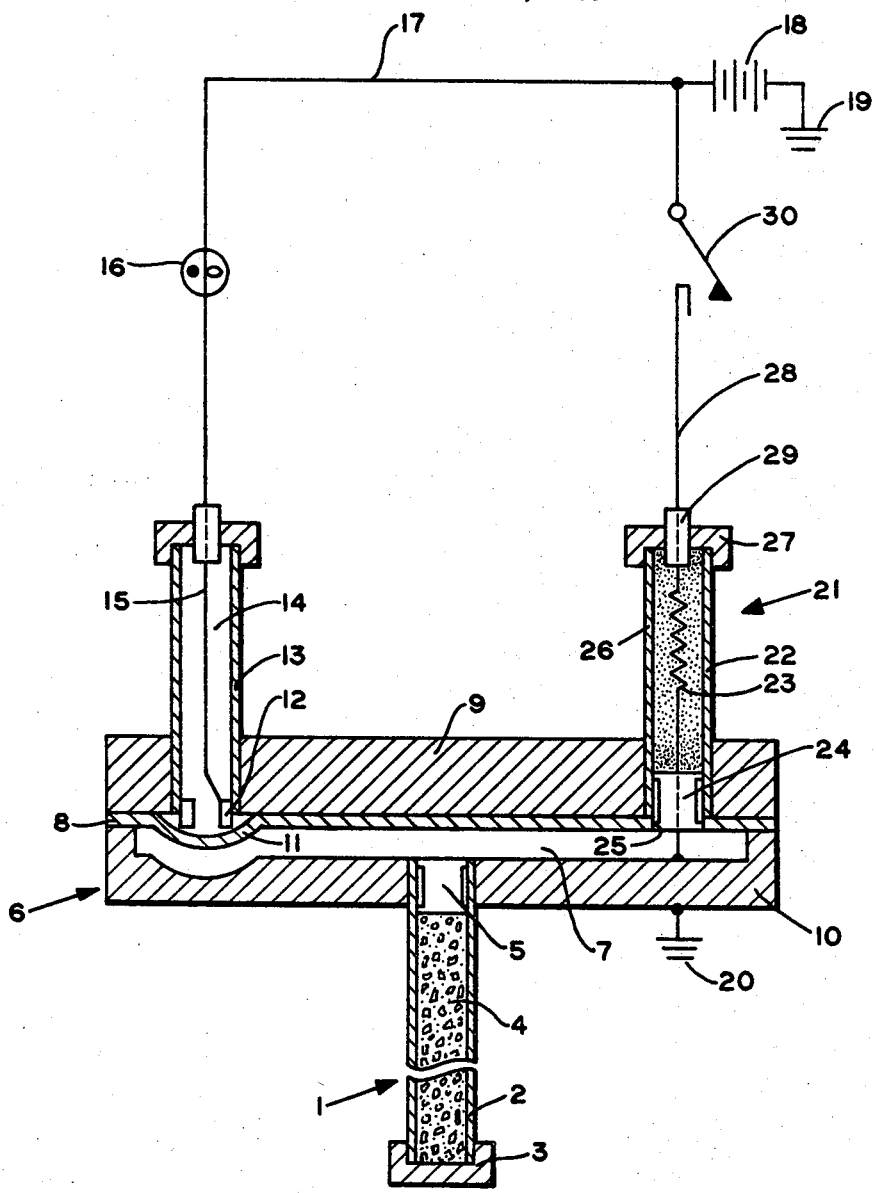

John E. Lindberg, Jr., 1211 Upper Happy Valley Road, Lafayette, Calif. 94549
Continuation-in-part of application Ser. No. 176,095, Feb. 27, 1962, which is a continuation-in-part of application Ser. No. 65,891, Oct. 31, 1960, which is a division of application Ser. No. 815,406, May 25, 1959, now Patent No. 3,122,728. This application Mar. 18, 1965, Ser. No. 440,857
7 Claims. (Cl. 23—316)

ABSTRACT OF THE DISCLOSURE

A method of pretreating a metallic hydride, usually a powder, of the type that contains some oxide impurities and that emits hydrogen when heated hot enough and takes it back in when cooled, the purpose of the pretreatment being to assure consistent ingassing and outgassing in a closed system. The hydride is heated in said system, preferably electrically, to a temperature well above its threshold temperature, so that it outgasses hydrogen and becomes stabilized with respect to the oxides; the hydride is then cooled to well below the threshold temperature to reingas some of the hydrogen; then the hydrogen that did not reingas is withdrawn from said system until a desired pressure level is reached; then the closed system is sealed. The system may be substantially evacuated while and after withdrawing the hydrogen that did not reingas and filled before sealing with an inert atmosphere, comprising helium, neon, argon, krypton or xenon gas.

---

This application is a continuation-in-part of application Ser. No. 176,095, filed Feb. 27, 1962, which was a continuation-in-part of application Ser. No. 65,891, filed Oct. 31, 1960, both now abandoned, which was a division of application Ser. No. 815,406, filed May 25, 1959, now Patent No. 3,122,728.

This invention relates to a method of pretreating metallic hydrides, to assure consistent ingassing and outgassing in a closed system.

When most metal hydrides (whether true compounds or solutions of hydrogen in metal) are procured, it will generally be found that they are, so far as use in temperature detectors is concerned, over-charged with hydrogen. As a result, if they are heated in a closed system and then cooled, they will not reingas all the hydrogen which they emitted when heated. Moreover, the reingassing and outgassing thenceforward tend to be erratic and undependable, and the pressure in the closed system does not therefore truly correspond to the temperature to which that system is exposed.

The art recognizes alpha, beta, gamma and so on states of some metallic hydrides, containing different amounts of hyrogen induced under varying conditions. When such a hydride is outgassed into a relatively low-pressure atmosphere, such as an 18.7 p.s.i.a. argon atmosphere in a sensor chamber described in the parent application, I have found that it will not fully reingas when it cools to its original temperature, for the original conditions needed to cause such ingassing is not present. On repeated outgassing and ingassing, the amount ingassed tends to become progressively less, or to be erratic because of impurities contained in the original hydride which tend to interfere with the normal phenomena of ingassing and outgassing of hydrogen. I have found that oxides, a probable impurity to which little attention has been paid heretofore in this regard, tend to be particularly troublesome. I have found that the prior art does not yield constant and uniform results in fire detectors probably due to these oxides.

This problem is solved in the present invention by pretreating the commercial grade hydride both to achieve stabilization of the oxides and to convert the hydride into a stable compound or solution assuring repetitive and standardized results. The invention applies to all metallic hydrides of the type that emit hydrogen when heated above a threshold temperature, including hydrides of the alkali metals (lithium, sodium, potassium, etc.), the alkaline earth metals (calcium, barium, stontium, etc.), scandium, titanium, vanadium, palladium, ytterbium, zirconium, niobium, hafnium, tantalum, the rare earth metals (atomic numbers 57–71), and the actinide metals (atomic numbers 89 and on).

Another problem has been that of minimizing the transfer of the metal component of the hydride from one part of the tube to another due possibly to deposition at times when the hydride is outgassed. This has been a more severe problem than might be thought because some of this transfer has resulted in deposition of the metal onto the walls of the tubing of a fire detector containing the hydride. Moreover, this transferred metal has tended to diffuse itself within or upon the walls when they are metal, and the resulting alloy has tended to melt at a much lower temperature than the encasing metal of the tube. The result has sometimes been that holes would develop in the tube.

This vapor deposition problem I have found can be solved by including in the tube a gas which is inert with respect to the tube walls and to all the components in the tube. Helium and argon and other noble gases are satisfactory for this purpose. They appear to suppress this transfer, though I am not certain as to the mechanism involved or whether any current theory accurately explains how it is done.

Another problem has occurred when two hydrides have been used, one to use with a testing apparatus, the other as the actual sensor in a fire detector. Before this invention, there was a tendency for the hydrogen to transfer from one hydride to the other, with resultant changes in the characteristics and action of both of them.

The invention has solved this last-mentioned problem by using different hydrides with different threshold temperatures, as will be explained.

Other obects and advantages of the invention will appear from the following description.

The drawing is a somewhat schematic view showing on an enlarged scale a fire detection device in which the invention is practiced and an electrical current therefor. The main sensor tube has been broken in the middle to conserve space.

The drawing shows a fire-detection sensor 1, comprising a tube 2, preferably of an austenitic stainless steel, closed hermetically at one end by a cap 3 and containing a metallic hydride 4 such as titanium hydride, which may be in chunk form or in another form. The sensor 1 has an open end 5 that opens into a responder 6 at a chamber 7. The responder 6 has a diaphragm 8 clamped hermetically into a housing made up of two plates 9 and 10. The diaphragm 8 preferably has a dome-shaped blister 11, which is the active presure-sensitive element thereof, and on the opposite side of the diaphragm 8 is a contact member or electrode 12, located in a ceramic tube 13, which is also hermetically sealed after its interior 14 is set at a desired pressure. A wire 15 leads out from the tube 13 to a warning lamp 16, when a lead 17 goes to connect to a battery 18 or other source of electric power. The other side of the battery 18 may be grounded at 19, and the housing plate 10 may be grounded at 20 (or there may be a return wire), to complete the circuit. Normally the circuit is open, but when the gas pressure in the chamber 7 is sufficient to move the blister or dome 11 into contact with the electrode 12, the circuit is completed and the lamp 16 is lighted.

A test unit 21 may comprise a ceramic tube 22 containing a different powdered hydride 23 held in by a porous plug 24. The tube 22 is connected by a hole 25 through the diaphragm 8, with the chamber 7. An electrical filament 26 goes through the tube 22 to enable artificially heating the hydride 23. The tube 22 is hermetically closed by a cap 27 and is hermetically sealed to the plate 9. A wire 28 leads from the filament 26 via an insulator 29 to a normally open switch 30 and thence to the battery 18. Closure of the switch 30 heats the filament 26.

An example of practicing this invention is in making a device like one in the parent application, wherein the housng or tube 22 contains the test device 21 comprising the contained filament 26 and powdered metallic hydride 23, such as that of tantalum, titanium, vanadium, or palladium, the whole is purged, as described in the parent application and in its related case, Patent No. 3,153,847, and, near the end of the purging process, a vacuum is pulled on both ends. At this time the metallic hydride 23 is reconditioned by filling the tube and any other parts of the closed system, if any, with hydrogen at one atmosphere pressure (14.7 p.s.i.a.) at room temperature. Then the filament 26 is heated well above the threshold temperature for that particular hydride 23, e.g., to about 1,000° C. for titanium, by passing a current through it. This heat not only causes the hydride 23 to emit hydrogen; it also apparently frees the hydride of its oxides; those which remain are believed to be rendered inert in the hydride, and once treated they do not give trouble and produce no significant effect. Another interpretation is that this heat cracks oxide coatings, providing fissures that thereafter afford entry to the metal. The filament 26 is then permitted to cool to room temperature, or at least to a temperature well below the threshold temperature, while the hydride reingasses. At room temperature, the excess hydrogen that remains in the atmosphere after reingasing is withdrawn. Preferably, the tube 22 is evacuated of all the hydrogen gas and filled with an inert atmosphere, such as argon or other noble gas, at any desired pressure, such as 18.7 p.s.i.a. The desired pressure may be obtained by letting some of the hydrogen gas remain, still withdrawing the excess, but the inert argon or helium is better for preventing transfer of the dehydrided metal at high temperatures or during outgasing, when it otherwise tends to migrate and depart on the walls 26 by vapor depositions.

When the tube 22 is used on a test device 21 in combination with the heat-detecting sensor 1 containing hydride of the same group of metals, as disclosed in my co-pending application Ser. No. 271,043 filed Apr. 1, 1963, now Patent No. 3,277,860 a continuation-in-part of application Ser. No. 102,622, filed Apr. 10, 1961 and now abandoned, the hydride 23 in the testing tube 22 with the electric filament 26 should be of a metal hydride that ingasses and outgasses at a lower threshold temperature than that in the heat detecting sensor 1, in order that the sensor hydride 4 not be affected by operation of the electrically heated hydride. This can be determined by tables. For example, palladium hydride and vanadium hydride outgas at lower threshold temperatures than zirconium hydride, so they can be used in a test unit 21 with a sensor 1 having zirconium hydride.

For getting rid of the oxides, a high temperature is needed during the pre-treatment. For example, dissolution of the oxides in titanium hydride is best obtained by heating to about 2,000° F. under vacuum conditions. The necessary heating, in all instances, is preferably done electrically, as by the filament 26, because precise temperature control is thereby obtained.

The invention is useful with hydrides (solutions or compounds) of alloys and with mixtures of alpha, beta, gamma, etc. hydrides as well as with any one state.

To those skilled in the art to which this invention relates, many changes in construction and widely differing embodiments and applications of the invention will suggest themselves without department from the spirit and scope of the invention. The disclosures and the description herein are purely illustrative and are not intended to be in any sense limiting.

I claim:

1. A method of pretreating for use in a closed system, a metallic hydride of the type that emits hydrogen when heated and takes it up when cooled, in order to assure consistent ingassing and outgassing in a closed system, consisting essentially of: heating said hydride in said closed system to a temperature that will outgas its hydrogen into said system; cooling said hydride to a desired temperature well below the outgassing temperature for that particular hydride in that system, to reingas as much of the hydrogen as will reingas under the pressure conditions then obtaining in said system; and withdrawing from said closed area the hydrogen that did not reingas until a desired pressure level in the system is reached, adjusting the final pressure level in the system to atmospheric pressure at room temperature, and sealing said closed system.

2. A method of pretreating a metallic hydride of the type that emits hydrogen when heated above an outgassing temperature and takes it up when cooled therebelow to assure consistent ingassing and outgassing in a closed system, said hydride normally containing some oxides comprising heating said hydride to above its outgassing temperature and to a temperature sufficient for dissolution of the oxides therein in a container forming part of said closed system, to outgas hydrogen into said closed system, cooling said hydride to a temperature below said outgassing temperature so that the hydride reingasses a stable amount of the hydrogen, then withdrawing from the closed system the hydrogen that did not reingas and then sealing said closed system, thereby leaving the hydride in a stable state in a closed system whereby it thereafter ingasses and outgasses repetitively to impart to the system a pressure having a one-to-one correspondence with the temperature of the hydride.

3. A method of pretreating a metallic hydride of the type that contains some oxide impurities and that emits hydrogen when heated hot enough and takes it back in when cooled, to assure consistent ingassing and outgassing in a closed system, comprising electrically heating said hydride in said system to a temperature well above its threshold temperature, thereby causing it to outgas hydrogen and to stabilize with respect to the oxides, cooling said hydride to well below said threshold temperature to reingas some of the hydrogen, then withdrawing from said system the hydrogen that did not reingas until a desired pressure level is reached, and then sealing said closed system.

4. The method of claim 3 wherein said system is substantially evacuated while and after withdrawing the hydrogen that did not reingas and then is filled with inert atmosphere.

5. The method of claim 4 wherein said inert atmosphere comprises gas chosen from the group consisting of helium, neon, argon, krypton, and xenon.

6. The method of claim 5 wherein said gas is argon.

7. A method of pretreating a powdered metallic hydride of the type that outgasses hydrogen when heated above a certain temperature and reingasses when cooled, to assure consistent ingassing and outgassing in a closed system, comprising: heating said hydride in said closed system well above its threshold temperature to outgas hydrogen into said system; cooling said hydride to about room temperature to reingas as much of the hydrogen as will reingas at room temperature under the pressure conditions then obtaining in said system; withdrawing from said closed system the hydrogen that did not reingas; then adding a charge of noble gas to said system, and then sealing said system.

References Cited

UNITED STATES PATENTS

| | | | |
|---|---|---|---|
| 2,497,911 | 2/1950 | Reilly | 250—275 |
| 3,064,245 | 11/1962 | Lindberg | 340—229 |
| 3,153,846 | 11/1964 | Lindberg | 340—229 |
| 3,177,479 | 4/1965 | Lindberg | 340—229 |

FOREIGN PATENTS

| | | |
|---|---|---|
| 812,945 | 5/1959 | Great Britain. |

CARL D. QUARFORTH, *Primary Examiner.*

A. J. STEINER, *Assistant Examiner.*